US010003793B2

(12) United States Patent
Fang et al.

(10) Patent No.: US 10,003,793 B2
(45) Date of Patent: Jun. 19, 2018

(54) PROCESSING OF PULSE CODE MODULATION (PCM) PARAMETERS

(71) Applicant: Google Technology Holdings LLC, Mountain View, CA (US)

(72) Inventors: Xue Fang, San Diego, CA (US); Limin Wang, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 1162 days.

(21) Appl. No.: 13/831,074

(22) Filed: Mar. 14, 2013

(65) Prior Publication Data

US 2014/0092984 A1 Apr. 3, 2014

Related U.S. Application Data

(60) Provisional application No. 61/708,052, filed on Oct. 1, 2012.

(51) Int. Cl.
H04N 7/12 (2006.01)
G06K 9/36 (2006.01)
H04N 19/60 (2014.01)
H04N 19/46 (2014.01)

(52) U.S. Cl.
CPC ....... H04N 19/00775 (2013.01); H04N 19/46 (2014.11)

(58) Field of Classification Search
CPC .......................... H04N 19/00775; H04N 7/30
USPC ........................................ 375/240.24–240.26
See application file for complete search history.

(56) References Cited

U.S. PATENT DOCUMENTS

| 7,957,600 | B2 | 6/2011 | Yang |
| 8,385,404 | B2 | 2/2013 | Bankoski et al. |
| 8,594,189 | B1 | 11/2013 | Bankoski et al. |
| 8,638,863 | B1 | 1/2014 | Bankoski et al. |
| 8,693,547 | B2 | 4/2014 | Bankoski et al. |

(Continued)

OTHER PUBLICATIONS

B. Bross, W.-J. Han, G. J. Sullivan, J.-R. Ohm, T. Wiegand, "High Efficiency Video Coding (HEVC) text specification draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, JCTVC-I1003_d9, 278 pages.

(Continued)

Primary Examiner — Tsion B Owens
(74) Attorney, Agent, or Firm — Young Basile Hanlon & MacFarlane, P.C.

(57) ABSTRACT

In one embodiment, a method determines a pulse code modulation (PCM) flag that indicates whether a PCM mode can be used to encode or decode a portion of video. A single conditional statement is evaluated once to determine if the PCM flag indicates the PCM mode is enabled. Based on the evaluating of the single conditional statement, when the PCM flag indicates the PCM mode is enabled, the method encodes or decodes a first PCM parameter, a second PCM parameter, a third PCM parameter, a fourth PCM parameter, and a fifth PCM parameter. The first PCM parameter, the second PCM parameter, the third PCM parameter, the fourth PCM parameter, and the fifth PCM parameter are encoded or decoded consecutively without any bits or syntax between them in or from an encoded bitstream associated with the portion of video.

20 Claims, 10 Drawing Sheets

(56) References Cited

U.S. PATENT DOCUMENTS

| | | | |
|---|---|---|---|
| 8,781,004 | B1 | 7/2014 | Bankoski et al. |
| 8,798,131 | B1 | 8/2014 | Bankoski et al. |
| 2003/0185455 | A1 | 10/2003 | Goertzen |
| 2004/0258156 | A1 | 12/2004 | Chujoh et al. |
| 2005/0180500 | A1 | 8/2005 | Chiang et al. |
| 2008/0279466 | A1 | 11/2008 | Yang |
| 2010/0027625 | A1 | 2/2010 | Wik et al. |
| 2010/0061461 | A1 | 3/2010 | Bankoski et al. |
| 2010/0166069 | A1 | 7/2010 | Goel |
| 2012/0027084 | A1 | 2/2012 | Zhang et al. |
| 2012/0257676 | A1 | 10/2012 | Bankoski et al. |
| 2012/0257677 | A1 | 10/2012 | Bankoski et al. |
| 2013/0044817 | A1 | 2/2013 | Bankoski et al. |
| 2013/0336395 | A1* | 12/2013 | Joshi .................. H04N 19/176 375/240.12 |
| 2014/0023138 | A1* | 1/2014 | Chen .................. H04N 19/597 375/240.12 |
| 2014/0036998 | A1* | 2/2014 | Narroschke ........ H04N 19/0089 375/240.03 |
| 2014/0140406 | A1 | 5/2014 | Yu et al. |
| 2014/0307779 | A1* | 10/2014 | Chono ............. H04N 19/00884 375/240.02 |

OTHER PUBLICATIONS

Anonymous: "Study Text of ISO/IEC DIS 23800-2 High Efficiency Video Coding", 102. MPEG Meeting ; Oct. 15, 2012-Oct. 19, 2012; Shanghai; (Motion Picture Expert Group or ISO/IEC JTC1/SC29/WG11) No. N13155, Dec. 25, 2012, all pages.

Anonymous: "Text of ISO/IEC DIS 23800-2 High Efficiency Video Coding", 101. MPEG Meeting ; Jul. 16, 2012-Jul. 20, 2012; Stockholm; (Motion Picture Expert Group or ISO/IEC JTC1/SC29/WG11) No. N12935, Aug. 3, 2012, all pages.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Bross, Benjamin et al.: "High Efficiency Video Coding (HEVC) text specification draft 9,"JCT-VC , Nov. 8, 2012, Retrieved from the internet: URL: http://phenix.int-evry.fr/jct/doc_end_user/documents/11_Shanghai/wg11/JCTVC-K1003-v10.zip [retrieved on Mar. 7, 2014] all pages.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISR, "ISR Search Report and Written Opinion of the International Searching Authority" for International Application No. ISR/US2013/065870 (CS41073) dated Apr. 10, 2014, 15 pages.

Mozilla, "Introduction to Video Coding Part 1: Transform Coding", Video Compression Overview, Mar. 2012, 171 pp.

Overview; VP7 Data Format and Decoder. Version 1.5. On2 Technologies, IxNC. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

VP8 Data Format and Decoding Guide. WebM Project. Google On2. Dated: Dec. 1, 2010.

* cited by examiner

| seq_paramter_set_rbsp ( ) { | Descriptor |
|---|---|
| video_parameter_set_id | u(4) |
| sps_max_sub_layers_minus1 | u(3) |
| sps_reserved_zero_bit | u(1) |
| profile_tier_level( I, sps_max_sub_layers_minus1) | |
| seq_parameter_set_id | ue(v) |
| ... | ue(v) |
| bit_depth_luma_minus8 | ue(v) |
| bit_depth_chorma_minus8 | ue(v) |
| log2_max_pic_order_cnt_lsb_minus4 | ue(v) |
| for( i = 0; i <= sps_max_sub_layers_minus1 ; i++ ) { | |
| sps_max_dec_pic_buffering [ i ] | ue(v) |
| sps_max_num_reorder_pics [ i ] | ue(v) |
| sps_max_latency_increase [ i ] | ue(v) |
| { | |
| restricted_ref_pic_lists_flag | u(1) |
| if( restricted_ref_pic_lists_flag ) | |
| lists_modification_present_flag | u(1) |
| log2_min_luma_coding_block_size_minus3 | ue(v) |
| log2_diff_max_min_luma_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_h iera rchy_depth_intra | ue(v) |
| scaling_list_enable_flag | u(1) |
| if(scaling_list_enable_flag) : | |
| sps_scaling_list_data_present_flag | u(1) |
| if(sps_scaling_list_data_present_flag) | |
| scaling_list_data( ) | |
| } | |
| amp_enabled_flag | u(1) |

| | | |
|---|---|---|
| 516-2 → | sample_adaptive_offset_enabled_flag | u(1) |
| | sps_temporal_id_nesting_flag | u(1) |
| | num_short_term_ref_pic_sets | ue(v) |
| | for(i =0; i< num short term_ref_pic_sets; i++) | |
| | short_term_ref_pics_set( i ) | |
| | long_term_ref_pics_present_flag | u(1) |
| | if( long_term_ref_pics_present_flag ) { | |
| | num_long_term_ref_pics_sps | ue(v) |
| | for( i =0; i< num_long_term_ref_pics_sps; i++ ) { | |
| | lt_ref_pic_poc_lsb_sps[ i ] | u(v) |
| | used_by_curr_pic_lt_sps_flag[ i ] | u(1) |
| | } | |
| | } | |
| | sps_temporal_mvp_enable_flag | u(1) |
| 502 → | pcm_enabled_flag | u(1) |
| 504 → | if( pcm_enabled_flag ) { | |
| 508-1 → | pcm_sample_bit_depth_luma_minus1 | u(4) |
| 510-1 → | pcm_sample_bit_depth_chorma_minus1 | u(4) |
| 512-1 → | log2_diff_min_pcm_luma_coding_block_size _minus3 | ue(v) |
| 512-1 → | log2_diff_max_min_pcm_luma_coding_block_size | ue(v) |
| 514-1 → | pcm_loop_filter_disable_flag | u(1) |
| | } | |
| | vui_parameters_present_flag | u(1) |
| | if( vui_parameters_present_flag ) | |
| | vui_parameters( ) | |
| | sps_extension_flag | u(1) |
| | if( sps_extension_flag ) | |
| | while( more_rbsp_data( ) ) | |
| | sps_extension_data_flag | u(1) |
| | rbsp_trailing_bits( ) | |

PROCESSING OF PULSE CODE MODULATION (PCM) PARAMETERS

CROSS-REFERENCES TO RELATED APPLICATIONS

The present disclosure claims priority to U.S. Provisional Application No. 61/708,052, entitled "Proposed Improvement on High Level Syntax", filed Oct. 1, 2012, the contents of which is incorporated herein by reference in its entirety.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)).

High efficiency video coding (HEVC) is also a block-based hybrid spatial and temporal predictive coding scheme. HEVC partitions an input picture into square blocks referred to as coding tree units (CTUs) as shown in FIG. 1. Unlike prior coding standards, the CTU can be as large as 128×128 pixels. Each CTU can be partitioned into smaller square blocks called coding units (CUs). FIG. 2 shows an example of a CTU partition of CUs. A CTU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of CTU 100. Further, a CU 102-2 has been split into four CUs 102-5, 102-6, 102-7, and 102-8.

Each CU 102 may include one or more blocks, which may be referred to as prediction units (PUs). FIG. 3A shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

Unlike prior standards where only one transform of 8×8 or 4×4 is applied to a macroblock, a set of block transforms of different sizes may be applied to a CU 102. For example, the CU partition of PUs 202 shown in FIG. 3A may be associated with a set of transform units (TUs) 204 shown in FIG. 3B. In FIG. 3B, PU 202-1 is partitioned into four TUs 204-5-204-8. Also, TUs 204-2, 204-3, and 204-4 are the same size as corresponding PUs 202-2-202-4. Each TU 204 can include one or more transform coefficients. Transform coefficients of the TU 204 can be quantized into one of a finite number of possible values. After the transform coefficients have been quantized, the quantized transform coefficients can be entropy coded to obtain the final compressed bits that can be sent to a decoder.

The above process encodes video using prediction, transformation, and quantization, which is a lossy compression process. For example, data lost by quantization may not be recoverable when the video is reconstructed by the decoder. In some cases, an encoder may want to encode video using a lossless compression process. For example, pulse code modulation (PCM) is a way to compress video in a lossless manner. That is, when video is compressed and decompressed, the original video that is compressed can be reconstructed without any loss. For example, using PCM, a pixel value is encoded and decoded without losing any information for the pixel value.

BRIEF DESCRIPTION OF THE DRAWINGS

FIG. 5B shows a more detailed example of the syntax according to one embodiment.

DETAILED DESCRIPTION

Figure 1:
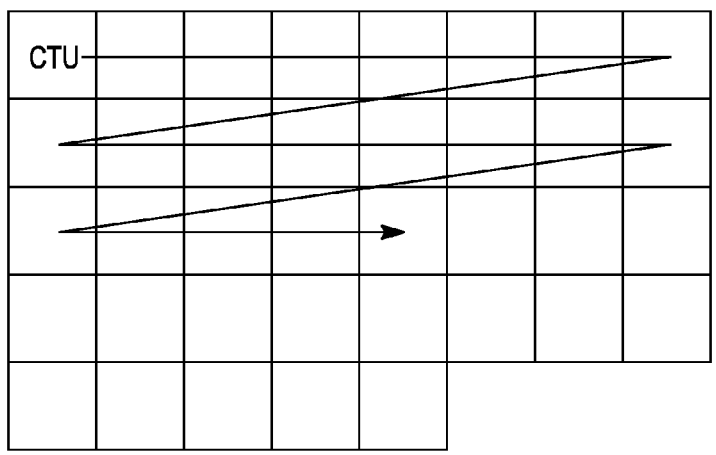
FIG. 1 shows an input picture partitioned into square blocks referred to as coding tree units (CTUs).
Figure 2:
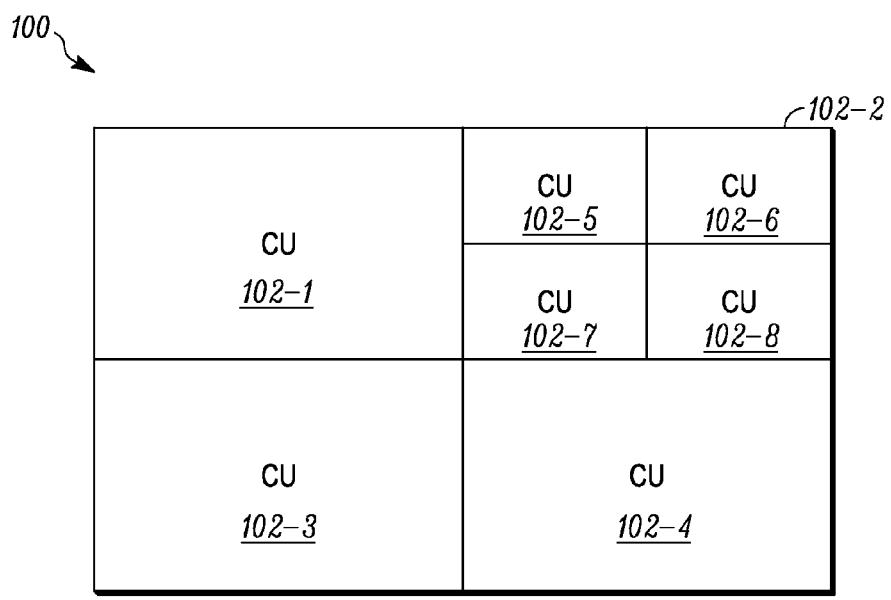
FIG. 2 shows an example of a coding tree unit (CTU) partition of coding units (CUs).
Figure 3A:
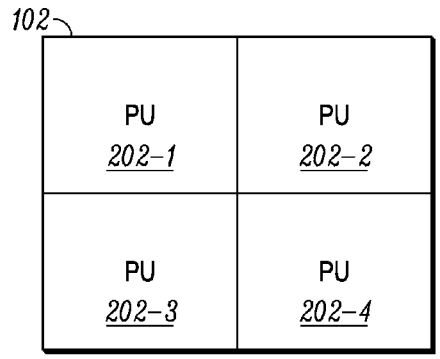
FIG. 3A shows an example of a CU partition of prediction units (PUs).
Figure 3B:
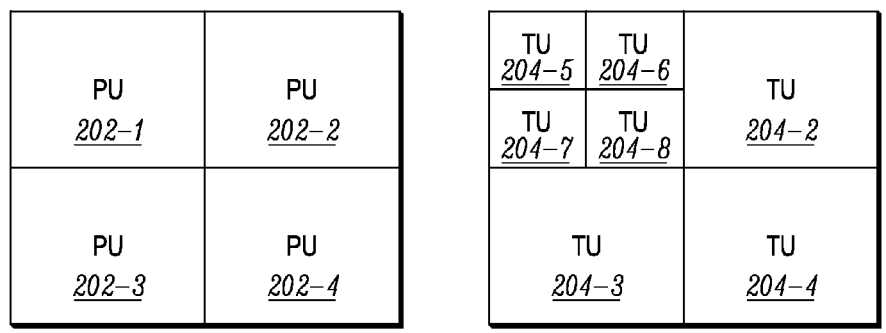
FIG. 3B shows an example of a transform unit (TU) partition of PUs.

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method determines a pulse code modulation (PCM) flag that indicates whether a PCM mode can be used to encode or decode a portion of video. A single conditional statement is evaluated once to determine if the PCM flag indicates the PCM mode is enabled. Based on the evaluating of the single conditional statement, when the PCM flag indicates the PCM mode is enabled, the method encodes or decodes a first PCM parameter indicating a bit depth for representing a PCM luma component of the portion of video, a second PCM parameter indicating a bit depth for representing a PCM chroma component of the portion of video, a third PCM parameter indicating a minimum block size for one or more PCM luma coding blocks of the portion of video, a fourth PCM parameter indicating a difference between the minimum block size and a maximum block size for the one or more PCM luma coding blocks of the portion of video, and a fifth PCM parameter indicating whether a PCM loop filter is disabled or enabled for the portion of video. The first PCM parameter, the second PCM parameter, the third PCM parameter, the fourth PCM parameter, and the fifth PCM parameter are encoded or decoded consecutively without any other bits or syntax between the first PCM parameter, the second PCM parameter, the third PCM parameter, the fourth PCM parameter, and the fifth PCM parameter in or from an encoded bitstream associated with the portion of video.

In one embodiment, a decoder includes: one or more computer processors; and a non-transitory computer-readable storage medium comprising instructions that, when executed, control the one or more computer processors to be configured for: determining an encoded bitstream; determining a pulse code modulation (PCM) flag in the encoded bitstream that indicates whether a PCM mode can be used to encode or decode a portion of video; evaluating a single conditional statement once to determine if the PCM flag indicates the PCM mode is enabled; based on the evaluating of the single conditional statement, when the PCM flag indicates the PCM mode is enabled, performing: decoding a first PCM parameter indicating a bit depth for representing a PCM luma component of the portion of video; decoding a second PCM parameter indicating a bit depth for representing a PCM chroma component of the portion of video; decoding a third PCM parameter indicating a minimum block size for one or more PCM luma coding blocks of the portion of video; decoding a fourth PCM parameter indicating a difference between the minimum block size and a maximum block size for the one or more PCM luma coding blocks of the portion of video; and decoding a fifth PCM parameter indicating whether a PCM loop filter is disabled or enabled for the portion of video, wherein the first PCM parameter, the second PCM parameter, the third PCM parameter, the fourth PCM parameter, and the fifth PCM parameter are decoded consecutively without any other bits or syntax between the first PCM parameter, the second PCM parameter, the third PCM parameter, the fourth PCM parameter, and the fifth PCM parameter from the encoded bitstream associated with the portion of video.

In one embodiment, an encoder includes: one or more computer processors; and a non-transitory computer-readable storage medium comprising instructions that, when executed, control the one or more computer processors to be configured for: determining a pulse code modulation (PCM) flag that indicates whether a PCM mode can be used to encode or decode a portion of video; evaluating a single conditional statement once to determine if the PCM flag indicates the PCM mode is enabled; based on the evaluating, when the PCM flag indicates the PCM mode is enabled, performing encoding a first PCM parameter indicating a bit depth for representing a PCM luma component of the portion of video; encoding a second PCM parameter indicating a bit depth for representing a PCM chroma component of the portion of video; encoding a third PCM parameter indicating a minimum block size for one or more PCM luma coding blocks of the portion of video; encoding a fourth PCM parameter indicating a difference between the minimum block size and a maximum block size for the one or more PCM luma coding blocks of the portion of video; and encoding a fifth PCM parameter indicating whether a PCM loop filter is disabled or enabled for the portion of video, wherein the first PCM parameter, the second PCM parameter, the third PCM parameter, the fourth PCM parameter, and the fifth PCM parameter are encoded consecutively without any other bits or syntax between the first PCM parameter, the second PCM parameter, the third PCM parameter, the fourth PCM parameter, and the fifth PCM parameter in an encoded bitstream associated with the portion of video.

Figure 4:
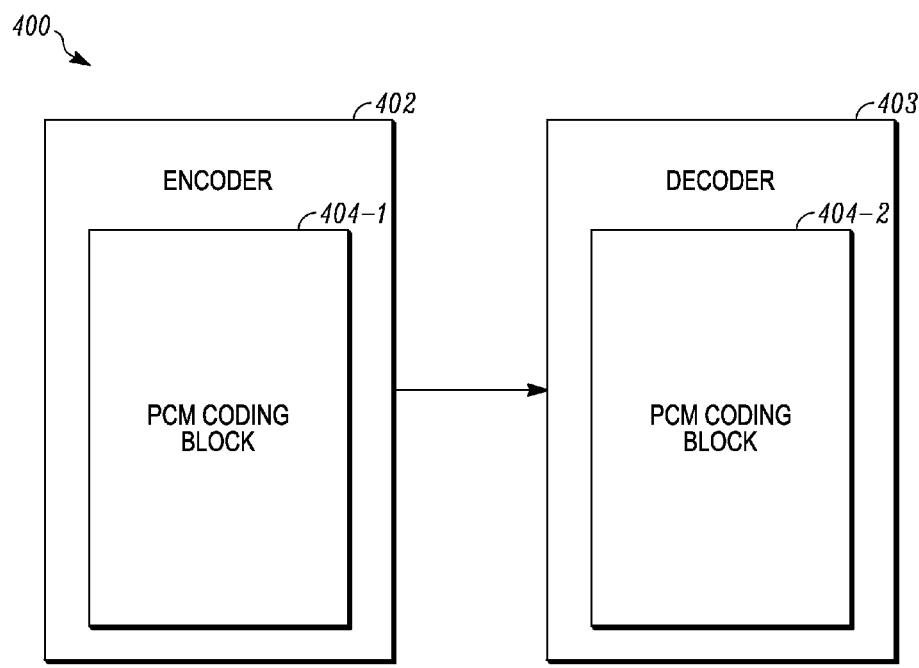
FIG. 4 depicts an example of a system for encoding and decoding video content according to one embodiment.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a PCM coding block 404-1 and decoder 403 includes a PCM coding block 404-2. When PCM coding block 404 is referred to, the processes may be performed in encoding video and/or decoding video in either PCM coding block 404-1 and/or PCM coding block 404-2. In one embodiment, PCM coding block 404-1 performs an encoding process using PCM and PCM coding block 404-2 performs a decoding process using PCM.

As discussed above, when PCM is used to code portions of video, the portions of video may be encoded and decoded in a lossless manner. PCM generates a digital representation of an analog signal (e.g., video) where the magnitude of the signal is sampled regularly at uniform intervals, and then quantized to a series of symbols in a digital (usually binary) code. The digital codes are not compressed and can be reconstructed without any loss. PCM is generally known in the art. Also, although PCM is discussed, other lossless compression methods may also be appreciated.

When compressing video, PCM may only be used for certain portions of the video being encoded. For example, encoder 402 may determine that some portion of video is important and should be encoded using PCM. In this case, encoder 402 encodes the portion of video (e.g., a block, multiple blocks, slice, picture, or series of pictures) using PCM. When encoder 402 determines that another portion of video does not need to be encoded using PCM, then encoder 402 reverts back to encoding the video using prediction, transformation, and quantization, which results in a loss of information from the original portion of video when the portion of video is reconstructed at decoder 403.

Encoder 402 uses a flag PCM_enabled_flag that indicates whether or not PCM data is present in a sequence of video. For example, a PCM mode may be enabled or disabled. When the flag PCM_enabled_flag is set to a first value, such as 0, which indicates that the PCM mode is disabled, then PCM data is not present in the sequence of video. However, when the flag PCM_enabled_flag is equal to a second value, such as 1, which indicates the PCM mode is enabled, then it is possible that PCM data is present in the sequence of video. Although PCM mode may be enabled, it is possible that encoder 402 does not encode any portions of video using PCM, but has the choice to do so. When PCM mode is disabled, encoder 402 cannot use PCM to encode any portions of video in the applicable sequence of video.

In one embodiment, the flag PCM_enabled_flag is found in a sequence parameter set (SPS) header. The SPS header is a header for a sequence of pictures. In this case, the flag PCM_enabled_flag governs whether PCM data may be found in the sequence of pictures that is associated with the SPS header. Although the flag PCM_enabled_flag is discussed as being in the SPS header, the flag PCM_enabled_flag may be located in other headers, such as in a slice header, or may be located at the block level. If the flag PCM_enabled_flag is in the slice header, the flag PCM_enabled_flag applies to all blocks in the slice. When at the block level, the flag PCM_enabled_flag applies to the block.

When the PCM mode is enabled, encoder 402 may decide encode portions of video using PCM coding block 404-1. This bypasses the prediction, transformation, and quantization steps as will be discussed in more detail below. In one example, when PCM mode is enabled for a sequence of pictures, encoder 402 may decide to encode certain pictures (or portions of pictures) in the sequence using PCM. Encoder 402 would indicate which portions of video were encoded using PCM to decoder 403. For example, encoder 402 indicates which blocks in a picture are encoded using PCM using a flag PCM_flag. That is, each block encoded using PCM has the flag PCM_flag set to a value, such as 1, to indicate the block was encoded using PCM.

Encoder 402 may encode parameters that are associated with the PCM mode. For example, the parameters govern how the PCM data was encoded and how the PCM data should be decoded. In one embodiment, the parameters include a bit depth for a PCM luma component and a bit depth for a PCM chroma component, a minimum coding block size for the PCM luma component, a difference between the maximum and minimum coding block size for the PCM luma component, and a flag that indicates whether loop filtering is disabled or not for PCM samples.

Figure 5A:
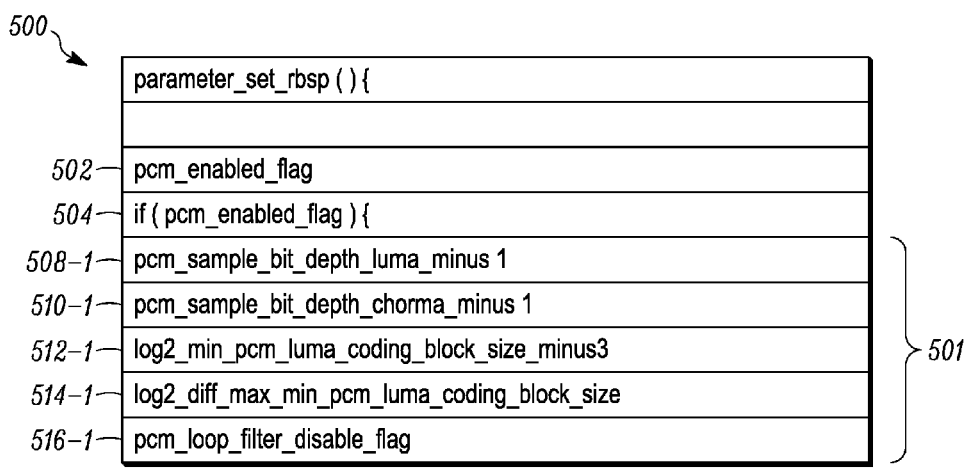
FIG. 5A shows an example of a syntax that describes a grouping of the parameters for the PCM coding mode according to one embodiment.

FIG. 5A shows an example of a syntax 500 that describes a grouping 501 of the parameters for the PCM coding mode according to one embodiment. Syntax 500 may be for a SPS header, but may be used for other headers. Syntax 500 governs how encoder 402 encodes the SPS header and how decoder 403 decodes the SPS header. Particular embodiments group the parameters for the PCM mode together in grouping 501 in the SPS header. For example, encoder 402 encodes the PCM parameters consecutively in the encoded bitstream. Then, decoder 403 may decode the PCM parameters consecutively when the encoded bitstream is received.

At 502, the flag PCM_enabled_flag is shown. The flag PCM_enabled_flag may indicate whether the PCM mode is enabled or disabled for the sequence of pictures. For example, as described above, encoder 402 may encode the value for the flag PCM_enabled_flag as 0 or 1.

At 504, syntax 500 includes a conditional statement (e.g., if statement) that tests whether the flag PCM_enabled_flag is enabled or disabled. If the flag PCM_enabled_flag is disabled, then encoder 402 does not encode the parameters shown in grouping 501 in the encoded bitstream. Further, decoder 403 does not attempt to decode the parameters shown in grouping 501 if the flag PCM_enabled_flag is disabled. However, if the flag PCM_enabled_flag is enabled, then the conditional statement evaluates to true, and encoder 402 encodes the PCM parameters shown in grouping 501 in the encoded bitstream and also decoder 403 decodes the PCM parameters from the encoded bitstream.

At 508-1, syntax 500 includes a parameter PCM_sample_bit_depth_luma_minus1. This parameter specifies the number of bits used to represent each of the PCM sample values of a luma component. For example, the video may be sampled at uniform intervals. The parameter PCM_sample_bit_depth_luma_minus1 is less than or equal to the value of the bit depth used to represent a non-PCM sample of a luma component. For example, the luma component of a sample (e.g., a pixel) may be represented by 8 bits; however, although the luma component is equal to 8 bits, a PCM sample could be represented by a different number of bits, such as 8 bits or less. Thus, syntax 500 uses a separate PCM parameter for the PCM luma component. In one example, if the bit depth for the PCM luma component is 4 bits, then the parameter PCM_sample_bit_depth_luma_minus1 is equal to "3".

At 510-1, a parameter PCM_sample_bit_depth_chroma_minus1 is shown. The parameter PCM_sample_bit_depth_chroma_minus1 specifies a number of bits used to represent each of the PCM sample values of chroma components. The value of the parameter PCM_sample_bit_depth_chroma_minus1 may be less than or equal to the value of the bit depth of the chroma component for a non-PCM sample. When the chroma component for non-PCM samples is represented by 8 bits, the chroma component of the PCM sample should be equal to 8 bits or less. For example, if the PCM sample bit depth is 4 bits and thus the parameter PCM_sample_bit_depth_chroma_minus1 is equal to "3".

At 512-1, a parameter log 2_diff_minPCM_luma_coding_block_size_minus3 defines the minimum luma coding block size for the PCM mode. For example, the parameter log 2_min_PCM_luma_coding_block_size_minus3+3 specifies the minimum size of coding blocks for the luma component that have been encoded using PCM (e.g., when a flag PCM_flag is equal to 1 for the coding block). The parameter log 2_diff_PCM_luma_coding_block_sizeminus3 takes the log base 2 of the minimum size of the PCM coding block for the luma component. For example, if the minimum block size is 8×8, then the 8×8 block is represented by $2^3$. This means then that the log 2 is "3". Then, the parameter log 2_min_PCM_luma_coding_block_size_minus3 is equal to 3−3=0.

At 514-1, the parameter log 2_diff_max_min_PCM_luma_coding_block_size specifies the difference between the maximum and minimum size of coding blocks that are coded using PCM (e.g., when a flag PCM_flag is equal to 1 for the block). In this case, the difference between the maximum PCM luma coding block size and the minimum PCM luma coding block size is calculated and can be used to determine the maximum PCM luma coding block size. For example, if the maximum PCM luma coding block size is 64×64, then the difference using the log 2 of the maximum and minimum sizes would be 6−3=3. In this case, the parameter log 2_diff_max_min_PCM_luma_coding_block_size is coded as the value of 3. This indicates that PCM luma coding block sizes are in the range of a 8×8 minimum block size to a 64×64 maximum block size. The maximum PCM luma coding block size may be different from the maximum coding block size. That is, the PCM coding block sizes may vary within the range of the minimum coding block size and the maximum coding block size.

At 516-1, a parameter PCM_loop_filter_disable_flag specifies whether the loop filter process is disabled on reconstructed samples that use the PCM mode (e.g., where the PCM_flag is equal to 1 for a block). If the parameter PCM_loop_filter_disable_flag is equal to 1, the de-blocking filter and sample adaptive offset filter processes on the reconstructed samples for a block decoded using PCM (e.g., with the PCM_flag equal to 1) are disabled. Otherwise, if the parameter PCM_loop_filter_disable_flag value is equal to 0, the de-blocking filter and sample adaptive offset filter processes on the reconstructed samples for a block decoded using PCM are enabled.

Conventionally, encoder 402 may have encoded the PCM parameters in different portions of the encoded bitstream due to the syntax not grouping the PCM parameters all together. In this case, every time PCM parameters in non-consecutive portions of the syntax could be inserted, the syntax specified a conditional statement should be evaluated to determine whether the PCM mode is enabled to determine whether to insert the PCM parameters. However, in particular embodiments, by encoding the parameters consecutively, the likelihood of error may be reduced and also computations are saved. For example, encoder 402 or decoder 403 only need to test the conditional statement once for the entire group of parameters.

FIG. 5B shows a more detailed example of syntax 500 according to one embodiment. The bit depth for the non-PCM samples of the luma component is shown at 508-2 and the bit depth for the non-PCM samples of the chroma component is shown at 510-2 in syntax 500. As is shown, the syntax of the PCM parameter grouping shown at 501 is not found after the parameter bit_depth_luma_minus8 shown at 508-2 or the parameter bit_depth_chroma_minus8 shown at 510-2, which means the parameters PCM_sample_bit_depth_luma_minus1 and PCM_sample_bit_depth_chroma_minus1 are not found after the parameters bit_depth_luma_minus8 and bit_depth_chroma_minus8 in the encoded bitstream. However, by grouping the parameters PCM_sample_bit_depth_luma_minus1 and PCM_sample_bit_depth_chroma_minus1 together with other PCM parameters, only one conditional statement needs to be evaluated for the grouping at 501. Conventionally, a first conditional (e.g., if statement) to test whether to include the parameters PCM_sample_bit_depth_luma_minus1 and PCM_sample_bit_depth_chroma_minus1 in the encoded bitstream or to decode the parameters from the encoded bitstream was included in the syntax right after the parameters bit_depth_luma_minus8 and bit_depth_chroma_minus8. This grouped the related parameters together, but as will be discussed below, caused multiple conditional statements to be tested.

Another parameter is used for the minimum size of blocks coded without using PCM for the luma component. For example, at 512-2, a parameter log 2_min_luma_coding_blocksize_minus3 specifies the minimum coding block size for the luma component. In this case, if the minimum coding block size for the luma component is 8×8, then the log 2 for the 8×8 block is 3. Then, the parameter log 2_min_luma_coding_block_size_minus3 is 3−3=0. In this case, the parameter log 2_min_coding_block_size_minus3 is set equal to 0. The PCM minimum luma coding block size may be less than or equal to the block size specified by the luma coding block size.

At 514-2, a parameter log 2_diff max_min_luma_coding_block_size specifies the difference between the maximum and minimum size of coding blocks for the luma component for non-PCM samples. The parameters log 2_min_luma_coding_block_size_minus3 and log 2_diff_max_min_luma_coding_block_size at 512-2 and 514-2, respectively, are separately located from the grouping shown at 501 in syntax 500. That is, the parameters log 2_min_PCM_luma_coding_block_size_minus3 and log 2_diff_max_min_PCM_luma_coding_block_size shown at 512-1 and 514-1, respectively, are not located after the parameters shown at 512-2 and 514-2. The parameters log 2_diff_min_PCM_luma_coding_block_size_minus3 and log 2_diff_max_min_PCM_luma_coding_block_size are moved in syntax 500 such that they can be included consecutively with the parameters PCM_sample_bit_depth_luma_minus1 and PCM_sample_bit_depth_chroma_minus1 shown at 508-1 and 510-1. This again requires only one conditional statement to be evaluated for all of the PCM parameters in the grouping shown at 501. Conventionally, a second conditional (e.g., if statement) to test whether to include the parameters log 2_diff_min_PCM_luma_coding_block_size_minus3 and log 2_diff_max_min_PCM_luma_coding_block_size in the encoded bitstream or to decode the parameters from the encoded bitstream was included in the syntax right after the parameters log 2_min_luma_coding_block_size_minus3 and log 2_diff_max_min_luma_coding_block_size. This grouped the related parameters together, but as will be discussed below, caused multiple conditional statements to be tested.

Another parameter is used for the loop filter process when not using PCM. For example, at 516-2, the flag sample_adaptive_offset_enabled_flag indicates whether or not the sample adaptive offset process is enabled or disabled for the sequence of pictures. The parameter PCM_loop_filter_disable_flag is not located after the flag sample_adaptive_offset_enabled_flag in syntax 500. Rather, the flag PCM_loop_filter_disabled_flag is grouped with the other PCM parameters consecutively in grouping 501. Conventionally, a third conditional (e.g., if statement) to test whether to include the parameter PCM_loop_filter_disable_flag in the encoded bitstream or to decode the parameter from the encoded bitstream was included in the syntax right after the parameter sample_adaptive_offset_enabled_flag. This caused three conditional statements to be tested.

As detailed above, because the PCM parameters are grouped consecutively, only one conditional statement needs to be evaluated by encoder 402 or decoder 403. Thus, computations are saved by reducing the number of conditional statements encoder 402 and decoder 403 need to evaluate. Further, by coding the PCM parameters consecutively, less error may result. For example, encoder 402 can consecutively encode the PCM parameters. Further, decoder 403 may know that the PCM parameters are included consecutively in the encoded bitstream and can perform error checking easily.

Figure 6:
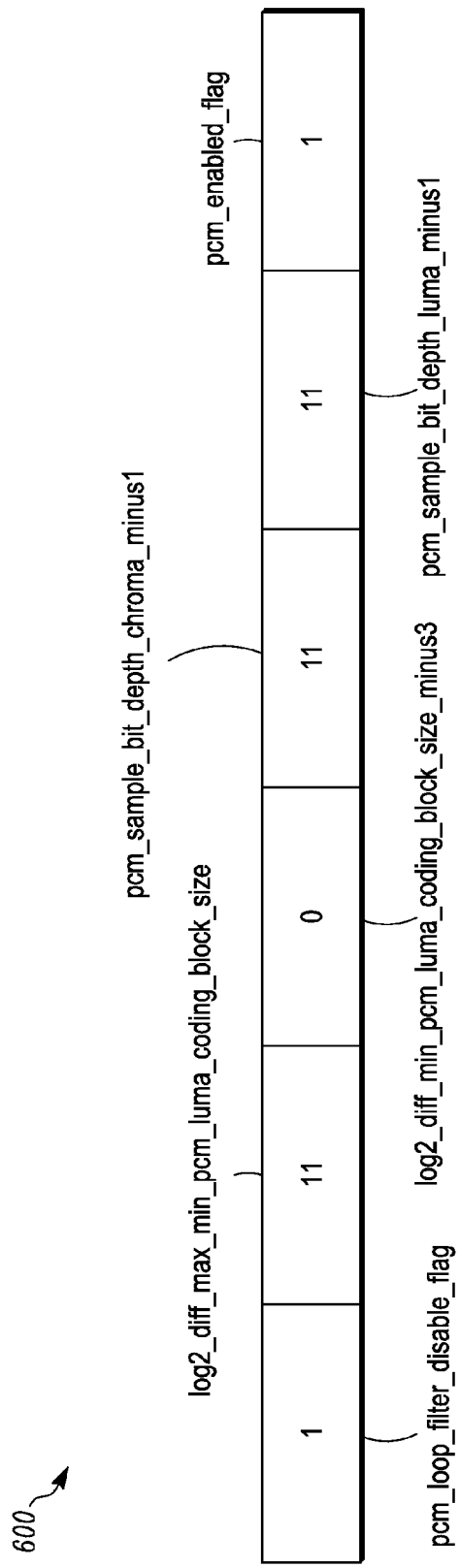
FIG. 6 shows an example of an encoded bitstream according to one embodiment.

FIG. 6 shows an example of an encoded bitstream 600 according to one embodiment. The encoded bitstream includes the flag PCM_enabled_flag. Additionally, in this example, the PCM_enabled_flag is enabled and thus following the PCM_enabled_flag in the encoded bitstream are the PCM parameters shown at 508-1, 510-1, 512-1, 514-1, and 516-1 in syntax 500. As discussed above, the PCM parameters are included consecutively in the encoded bitstream. For example, the values for the parameters PCM_sample_bit_depth_luma_minus1, PCM_sample_bit_depth_chroma_minus1, log 2_diff_min_PCM_luma_coding_block_size_minus3, log 2_diff_max_min_PCM_luma_coding_block_size, and PCM_loop_filter_disable_flag may be 3, 3, 0, 3, and 1. With the flag PCM_enabled_flag set as 1, then the bitstream from right to left includes the values of 1, 11, 11, 0, 11, and 1.

Figure 7:
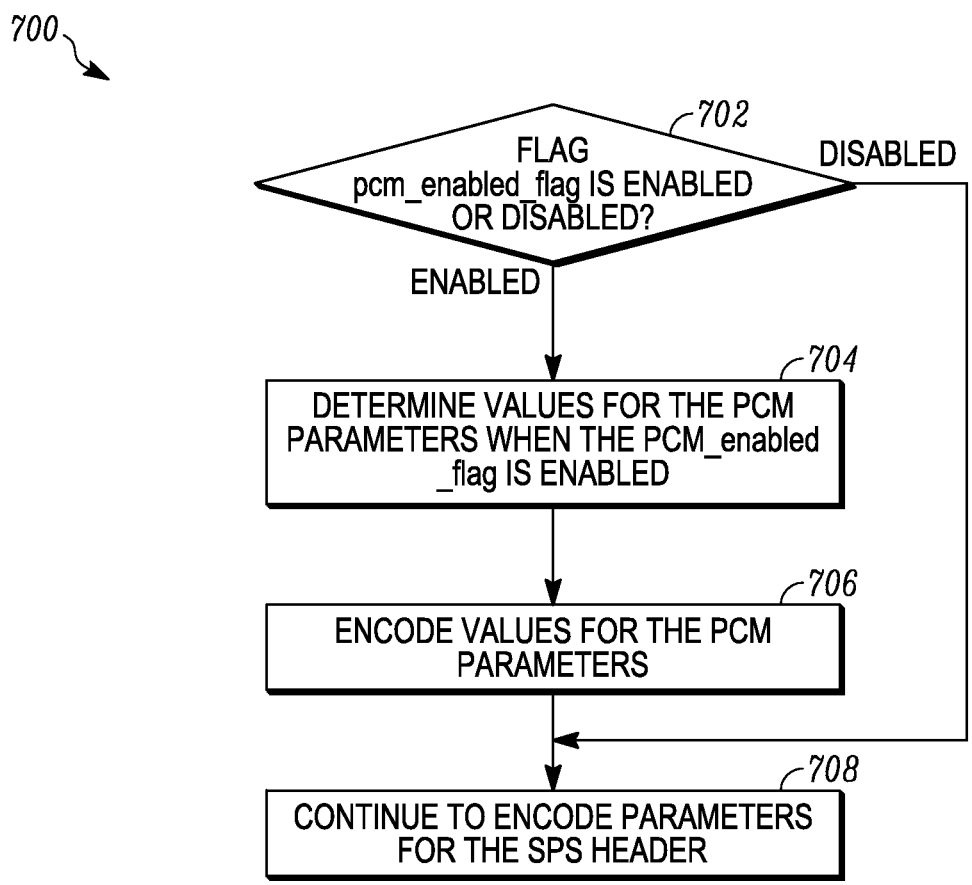
FIG. 7 depicts a simplified flowchart of a method for encoding PCM parameters according to one embodiment.

The following will now describe the encoding and decoding of the PCM parameters in more detail. FIG. 7 depicts a simplified flowchart 700 of a method for encoding PCM parameters according to one embodiment. At 702, encoder 402 determines if a flag PCM_enabled_flag is enabled or disabled. At 704, when the PCM_enabled_flag is enabled, at 704, encoder 402 determines values for the PCM parameters. For example, values for the parameters PCM_sample_bit_depth_luma_minus1, PCM_sample_bit_depth_chroma_minus1, log 2_diff_min_PCM_luma_coding_block_size_minus3, log 2_diff_max_min_PCM_luma_coding_block_size, and PCM_loop_filter_disable_flag are determined. At 706, encoder 402 encodes values for the PCM parameters. Alternatively, at 708, if the flag PCM_enabled_flag is disabled or after the PCM parameters have been encoded, encoder 402 continues to encode parameters for the SPS header.

Figure 8:
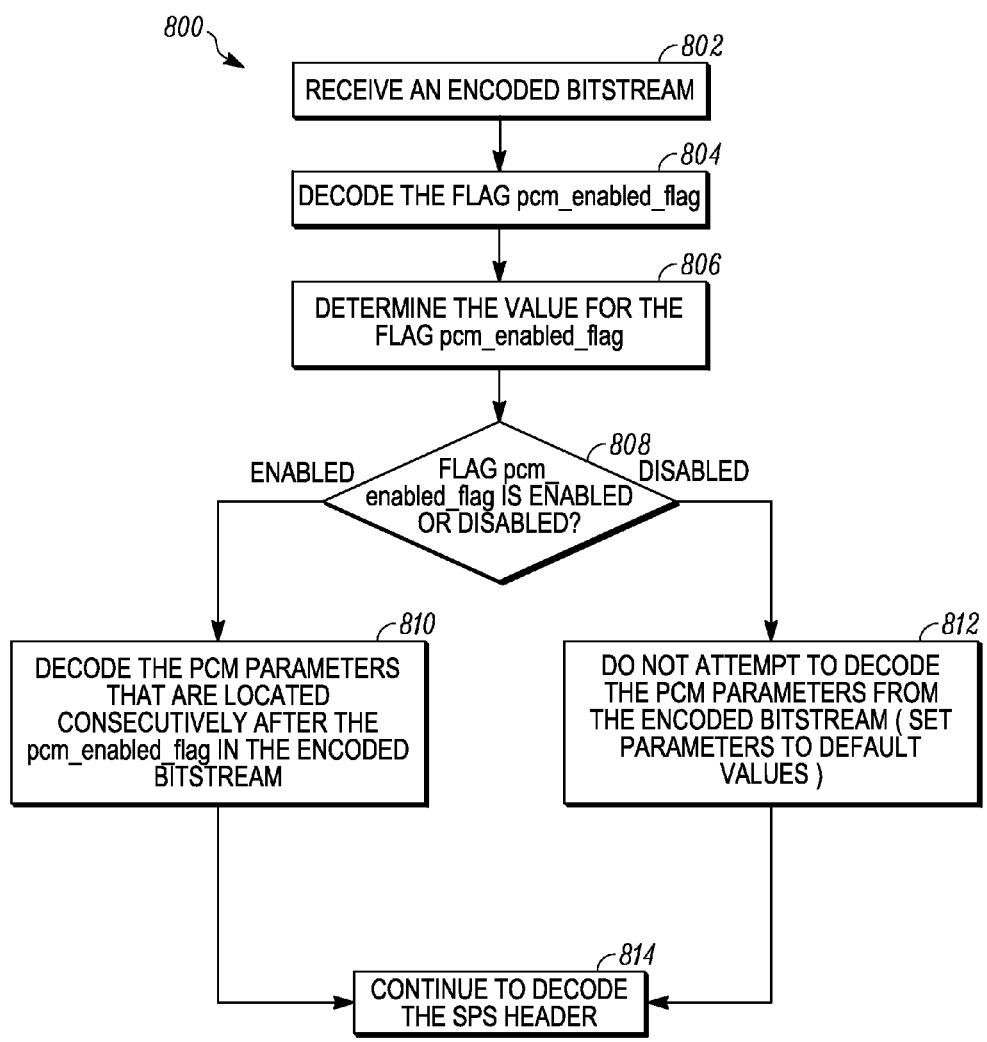
FIG. 8 depicts a simplified flowchart for decoding PCM parameters according to one embodiment.

FIG. 8 depicts a simplified flowchart 800 for decoding PCM parameters according to one embodiment. At 802, decoder 403 receives an encoded bitstream. The encoded bitstream may or may not include the PCM parameters depending on whether or not the PCM mode has been enabled or disabled for a sequence of pictures.

At 804, decoder 403 decodes the flag PCM_enabled_flag. At 806, decoder 403 determines the value for the flag PCM_enabled_flag. At 808, decoder 403 determines if the flag PCM_enabled_flag is enabled or disabled. If the value of the flag PCM_enabled_flag is equal to 1 (e.g., enabled), then, at 810, decoder 403 decodes the PCM parameters that are located consecutively after the PCM_enabled_flag in the encoded bitstream. For example, as discussed above, the parameters PCM_sample_bit_depth_luma_minus1, PCM_sample_bit_depth_chroma_minus1, log 2_diff_min_PCM_luma_coding_block_size_minus3, log 2_diff_max_min_PCM_luma_coding_block_size, and PCM_loop_filter_disable_flag are decoded.

At 812, if the PCM_enabled_flag is set to 0 (e.g., disabled), then decoder 403 does not attempt to decode the PCM parameters from the encoded bitstream. At 814, decoder 403 continues to decode the SPS header.

Figure 9:
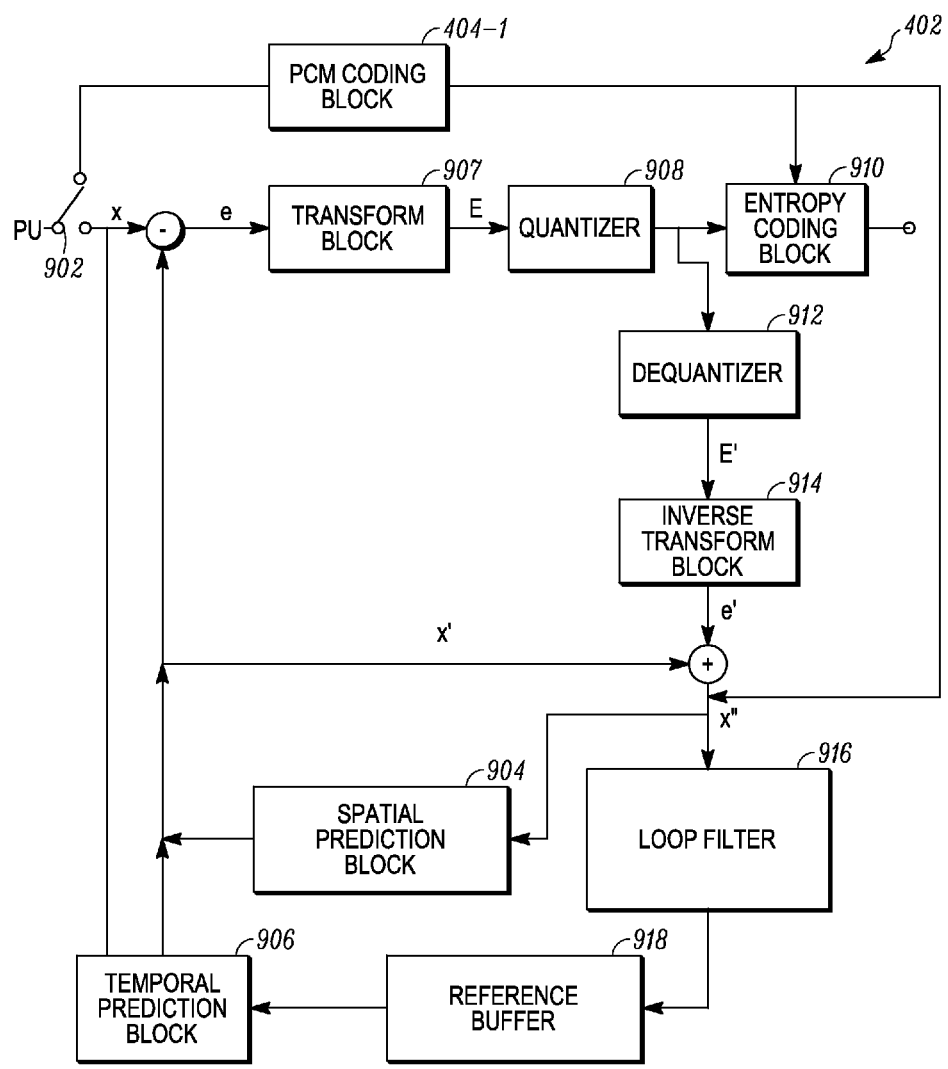
FIG. 9 depicts an example of an encoder according to one embodiment.

In various embodiments, encoder 402 can be incorporated or otherwise associated with a transcoder or an encoding apparatus at a headend and decoder 403 can be incorporated or otherwise associated with a downstream device, such as a mobile device, a set top box or a transcoder. FIG. 9 depicts an example of encoder 402 according to one embodiment. A general operation of encoder 402 will now be described; however, it will be understood that variations on the encoding process described will be appreciated by a person skilled in the art based on the disclosure and teachings herein.

As shown, a branch includes PCM encoding block 404-1. When portions of video are encoded using the PCM mode, the switch at 902 is switched to select the branch including PCM encoding block 404-1. In this case, transform block 907, quantizer 908, and entropy coding block 910 are skipped.

However, if encoding is performed using prediction, transformation, and quantization, then the following is performed. For a current PU, x, a prediction PU, x', is obtained through either spatial prediction or temporal prediction. The prediction PU is then subtracted from the current PU, resulting in a residual PU, e. Spatial prediction relates to intra mode pictures. Intra mode coding can use data from the current input image, without referring to other images, to code an I picture. A spatial prediction block 904 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block sizes is 35. An additional mode can be used for the Chroma intra prediction mode. In some embodiments, the Chroma prediction mode can be called "IntraFromLuma."

Temporal prediction block 906 performs temporal prediction. Inter mode coding can use data from the current input image and one or more reference images to code "P" pictures and/or "B" pictures. In some situations and/or embodiments, inter mode coding can result in higher compression than intra mode coding. In inter mode PUs can be temporally predictive coded, such that each PU of the CU can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more reference images, and can have up to one motion vector. B pictures may use data from the current input image and one or more reference images, and can have up to two motion vectors. The motion vectors and reference pictures can be coded in the encoded bitstream. In some embodiments, the motion vectors can be syntax elements "MV," and the reference pictures can be syntax elements "refIdx." In some embodiments, inter mode can allow both spatial and temporal predictive coding. The best match prediction is described by the motion vector (MV) and associated reference picture index (refIdx). The motion vector and associated reference picture index are included in the coded bitstream.

Transform block 907 performs a transform operation with the residual PU, e. A set of block transforms of different sizes can be performed on a CU, such that some PUs can be divided into smaller TUs and other PUs can have TUs the same size as the PU. Division of CUs and PUs into TUs can be shown by a quadtree representation. Transform block 907 outputs the residual PU in a transform domain, E.

A quantizer 908 then quantizes the transform coefficients of the residual PU, E. Quantizer 908 converts the transform coefficients into a finite number of possible values. In some embodiments, this is a lossy operation in which data lost by quantization may not be recoverable. After the transform coefficients have been quantized, entropy coding block 910 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a de-quantizer 912 de-quantizes the quantized transform coefficients of the residual PU. De-quantizer 912 then outputs the de-quantized transform coefficients of the residual PU, E'. An inverse transform block 914 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 916 performs de-blocking on the reconstructed PU, x", to reduce blocking artifacts. Additionally, loop filter 916 may perform a sample adaptive offset process after the completion of the de-blocking filter process for the decoded picture, which compensates for a pixel value offset between reconstructed pixels and original pixels. Also, loop filter 916 may perform adaptive loop filtering over the reconstructed PU, which minimizes coding distortion between the input and output pictures. Additionally, if the reconstructed pictures are reference pictures, the reference pictures are stored in a reference buffer 918 for future temporal prediction. Intra mode coded images can be a possible point where decoding can begin without needing additional reconstructed images.

Figure 10:
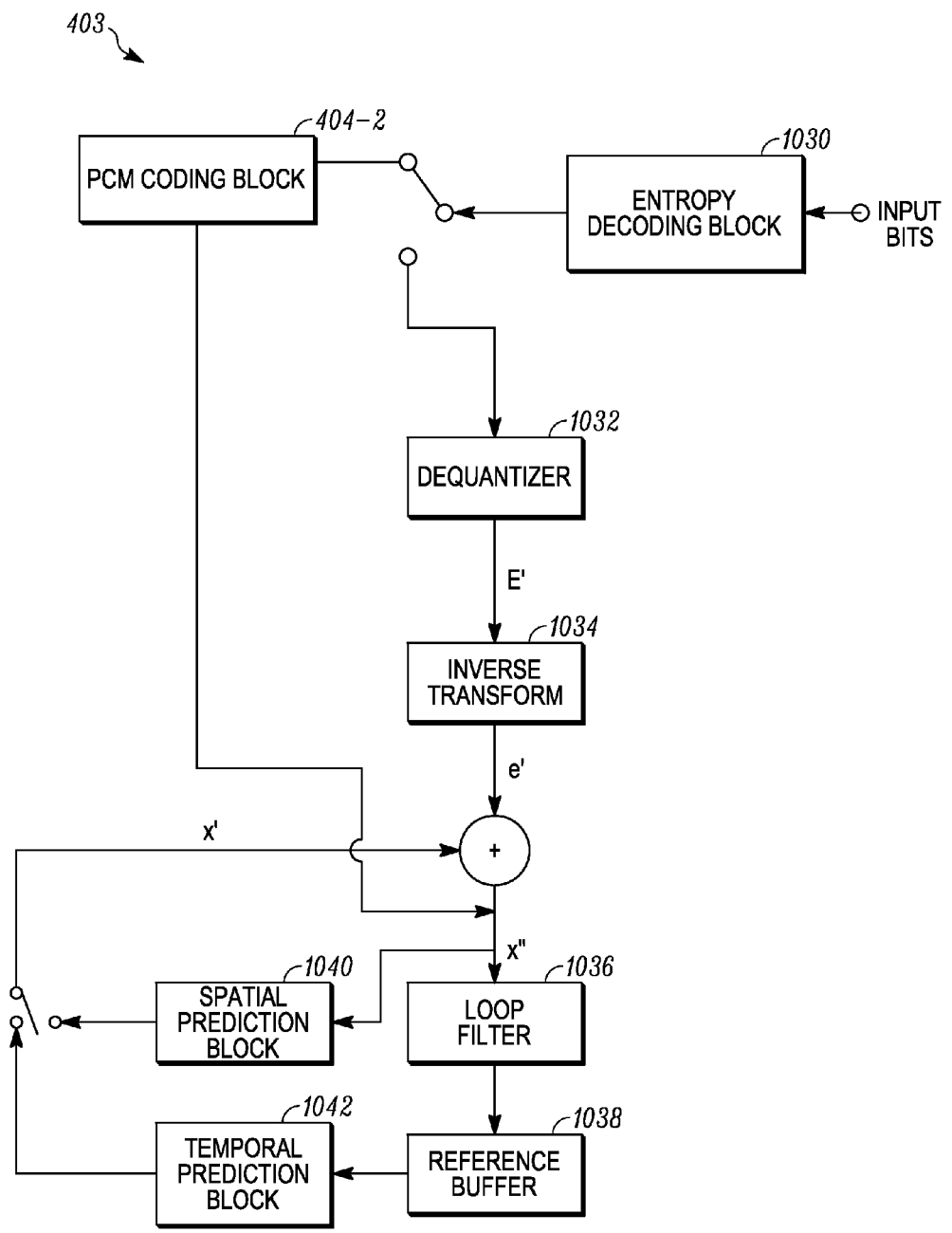
FIG. 10 depicts an example of a decoder according to one embodiment.

FIG. 10 depicts an example of decoder 403 according to one embodiment. A general operation of decoder 403 will now be described; however, it will be understood that variations on the decoding process described will be appreciated by a person skilled in the art based on the disclosure and teachings herein. Decoder 403 receives input bits from encoder 402 for encoded video content.

At 1002, a switch is used to select between the PCM decoding mode and a decoding mode using prediction, transformation, and quantization. When the switch is moved to select the PCM coding mode, portions of video are decoded using PCM decoding block 404-2. However, when the switch is switched to a second state, the portions of video are decoded using de-quantization, inverse transformation, and prediction.

An entropy decoding block 1030 performs entropy decoding on the input bitstream to generate quantized transform coefficients of a residual PU. A de-quantizer 1032 de-quantizes the quantized transform coefficients of the residual PU. De-quantizer 1032 then outputs the de-quantized transform coefficients of the residual PU, E'. An inverse transform block 1034 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 1036 performs de-blocking on the reconstructed PU, x", to reduce blocking artifacts. Additionally, loop filter 1036 may perform a sample adaptive offset process after the completion of the de-blocking filter process for the decoded picture, which compensates for a pixel value offset between reconstructed pixels and original pixels. Also, loop filter 1036 may perform adaptive loop filtering over the reconstructed PU, which minimizes coding distortion between the input and output pictures. Additionally, if the reconstructed pictures are reference pictures, the reference pictures are stored in a reference buffer 1038 for future temporal prediction.

The prediction PU, x', is obtained through either spatial prediction or temporal prediction. A spatial prediction block 1040 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1006 performs temporal prediction through a motion estimation operation. Particular embodiments may be used in determining the prediction, such as collocated reference picture manager 404 is used in the prediction process to determine the collocated reference picture to use. A decoded motion vector is used to determine the prediction PU, x'. Interpolation may be used in the motion estimation operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computing device, a pulse code modulation (PCM) flag that indicates whether a PCM mode can be used to encode or decode a portion of video;
    evaluating, by the computing device, a single conditional statement once to determine if the PCM flag indicates the PCM mode is enabled;
    in response to a determination that the PCM flag indicates the PCM mode is enabled, performing:
        encoding or decoding, by the computing device, a first PCM parameter indicating a bit depth for representing a PCM luma component of the portion of video;
        encoding or decoding, by the computing device, a second PCM parameter indicating a bit depth for representing a PCM chroma component of the portion of video;
        encoding or decoding, by the computing device, a third PCM parameter indicating a minimum block size for one or more PCM luma coding blocks of the portion of video;
        encoding or decoding, by the computing device, a fourth PCM parameter indicating a difference between the minimum block size and a maximum block size for the one or more PCM luma coding blocks of the portion of video; and
        encoding or decoding, by the computing device, a fifth PCM parameter indicating whether a PCM loop filter is disabled or enabled for the portion of video,
    wherein the first PCM parameter, the second PCM parameter, the third PCM parameter, the fourth PCM parameter, and the fifth PCM parameter are encoded or decoded consecutively without any other bits or syntax between the first PCM parameter, the second PCM parameter, the third PCM parameter, the fourth PCM parameter, and the fifth PCM parameter in or from an encoded bitstream associated with the portion of video.

2. The method of claim 1, wherein an order in the encoded bitstream is the first PCM parameter, the second PCM parameter, the third PCM parameter, the fourth PCM parameter, and the fifth PCM parameter.

3. The method of claim 1, wherein the PCM flag is set to a first value to enable the PCM mode or set to a second value to disable the PCM mode.

4. The method of claim 1, wherein when the PCM flag indicates the PCM mode is disabled, not encoding or decoding the first PCM parameter, the second PCM parameter, the third PCM parameter, the fourth PCM parameter, and the fifth PCM parameter in or from the encoded bitstream associated with the portion of video.

5. The method of claim 1, wherein the first PCM parameter is the bit depth for representing the PCM luma component of the portion of video minus 1 bit.

6. The method of claim 1, wherein the second PCM parameter is bit depth for representing the PCM chroma component of the portion of video minus 1 bit.

7. The method of claim 1, wherein the third PCM parameter is a log 2 of the minimum block size for a PCM luma coding block in the portion of video minus 3.

8. The method of claim 1, wherein the fourth PCM parameter is a log 2 of the difference between the minimum block size and the maximum block size for the a PCM luma coding block in the portion of video.

9. The method of claim 1, wherein the fifth PCM parameter is a first value to enable the PCM loop filter or a second value to disable the PCM loop filter.

10. The method of claim 1, wherein an order in the encoded bitstream varies among the first PCM parameter, the second PCM parameter, the third PCM parameter, the fourth PCM parameter, and the fifth PCM parameter.

11. A decoder comprising:
one or more computer processors; and
a non-transitory computer-readable storage medium comprising instructions that, when executed, control the one or more computer processors to be configured for:
   determining an encoded bitstream;
   determining a pulse code modulation (PCM) flag in the encoded bitstream that indicates whether a PCM mode can be used to encode or decode a portion of video;
   evaluating a single conditional statement once to determine if the PCM flag indicates the PCM mode is enabled;
   based on the evaluating of the single conditional statement, when the PCM flag indicates the PCM mode is enabled, performing:
      decoding a first PCM parameter indicating a bit depth for representing a PCM luma component of the portion of video;
      decoding a second PCM parameter indicating a bit depth for representing a PCM chroma component of the portion of video;
      decoding a third PCM parameter indicating a minimum block size for one or more PCM luma coding blocks of the portion of video;
      decoding a fourth PCM parameter indicating a difference between the minimum block size and a maximum block size for the one or more PCM luma coding blocks of the portion of video; and
      decoding a fifth PCM parameter indicating whether a PCM loop filter is disabled or enabled for the portion of video,
   wherein the first PCM parameter, the second PCM parameter, the third PCM parameter, the fourth PCM parameter, and the fifth PCM parameter are decoded consecutively without any other bits or syntax between the first PCM parameter, the second PCM parameter, the third PCM parameter, the fourth PCM parameter, and the fifth PCM parameter from the encoded bitstream associated with the portion of video.

12. The decoder of claim 11, wherein an order in the encoded bitstream is the first PCM parameter, the second PCM parameter, the third PCM parameter, the fourth PCM parameter, and the fifth PCM parameter.

13. The decoder of claim 11, wherein the PCM flag is set to a first value to enable the PCM mode or set to a second value to disable the PCM mode.

14. The decoder of claim 11, wherein when the PCM flag indicates the PCM mode is disabled, not decoding the first PCM parameter, the second PCM parameter, the third PCM parameter, the fourth PCM parameter, and the fifth PCM parameter in or from the encoded bitstream associated with the portion of video.

15. The decoder of claim 11, wherein:
the first PCM parameter is the bit depth for representing the PCM luma component of the portion of video minus 1 bit,
the second PCM parameter is bit depth for representing the PCM chroma component of the portion of video minus 1 bit,
the third PCM parameter is a log 2 of the minimum block size for a PCM luma coding block in the portion of video minus 3,
the fourth PCM parameter is a log 2 of the difference between the minimum block size and the maximum block size for the PCM luma coding block in the portion of video, and
the fifth PCM parameter is a first value to enable the PCM loop filter or a second value to disable the PCM loop filter.

16. An encoder comprising:
one or more computer processors; and
a non-transitory computer-readable storage medium comprising instructions that, when executed, control the one or more computer processors to be configured for:
   determining a pulse code modulation (PCM) flag that indicates whether a PCM mode can be used to encode or decode a portion of video;
   evaluating a single conditional statement once to determine if the PCM flag indicates the PCM mode is enabled;
   based on the evaluating, when the PCM flag indicates the PCM mode is enabled, performing:
      encoding a first PCM parameter indicating a bit depth for representing a PCM luma component of the portion of video;
      encoding a second PCM parameter indicating a bit depth for representing a PCM chroma component of the portion of video;
      encoding a third PCM parameter indicating a minimum block size for one or more PCM luma coding blocks of the portion of video;
      encoding a fourth PCM parameter indicating a difference between the minimum block size and a maximum block size for the one or more PCM luma coding blocks of the portion of video; and
      encoding a fifth PCM parameter indicating whether a PCM loop filter is disabled or enabled for the portion of video,
   wherein the first PCM parameter, the second PCM parameter, the third PCM parameter, the fourth PCM parameter, and the fifth PCM parameter are encoded consecutively without any other bits or syntax between the first PCM parameter, the second PCM parameter, the third PCM parameter, the fourth PCM parameter, and the fifth PCM parameter in an encoded bitstream associated with the portion of video.

17. The encoder of claim 16, wherein an order in the encoded bitstream is first PCM parameter, the second PCM parameter, the third PCM parameter, the fourth PCM parameter, and the fifth PCM parameter.

18. The encoder of claim 16, wherein the PCM flag is set to a first value to enable the PCM mode or set to a second value to disable the PCM mode.

19. The encoder of claim 16, wherein when the PCM flag indicates the PCM mode is disabled, not encoding the first PCM parameter, the second PCM parameter, the third PCM parameter, the fourth PCM parameter, and the fifth PCM parameter in or from the encoded bitstream associated with the portion of video.

20. The encoder of claim 16, wherein:
the first PCM parameter is the bit depth for representing the PCM luma component of the portion of video minus 1 bit,
the second PCM parameter is bit depth for representing the PCM chroma component of the portion of video minus 1 bit, the third PCM parameter is a log 2 of the minimum block size for a PCM luma coding block in the portion of video minus 3, the fourth PCM parameter is a log 2 of the difference between the minimum block size and the maximum block size for the PCM luma coding block in the portion of video, and the fifth PCM parameter is a first value to enable the PCM loop filter or a second value to disable the PCM loop filter.

* * * * *